July 5, 1927.
W. B. WILLS
FRYING BASKET
Filed Sept. 30, 1925
1,634,733
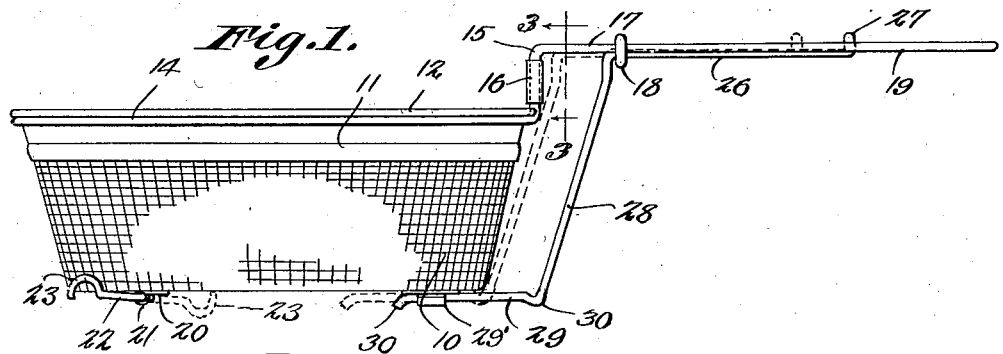
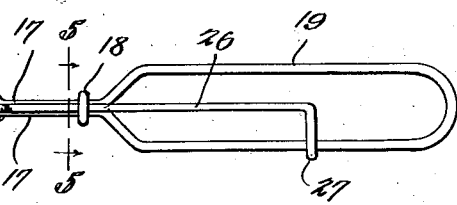
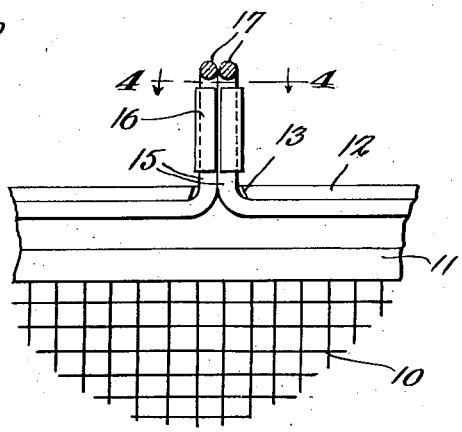
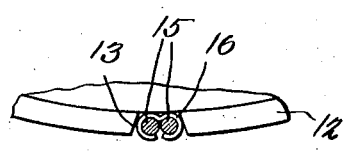
Fig. 4.
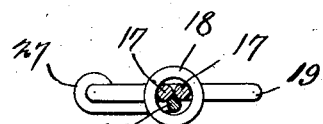
Fig. 5.
Inventor
Attorney Patented July 5, 1927.

1,634,733

UNITED STATES PATENT OFFICE.

WALTER BRUCE WILLS, OF BALTIMORE, MARYLAND.

FRYING BASKET.

Application filed September 30, 1925. Serial No. 59,514.

This invention relates to cooking utensils and has special relation to frying baskets and the like.

Frying baskets, colanders, strainers and the like having been constructed with projections or hooks which enable them to be supported on the rim of a second utensil so that the liquid contents of the first utensil may drain into the second utensil. It is especially desired to arrange for such draining in such cooking as the frying of oysters, doughnuts, potato chips and the like where it is necessary, to prevent surplus grease from adhering to the food, that the cooked food shall be kept hot while being drained. It is common to provide these hooks as members fixedly projecting from the lower part or bottom of the basket but it is not practicable to nest such baskets, one within another and thus a large amount of room is taken up in packing and storing.

One important object of the invention is to provide a utensil of this class which will have an improved arrangement of supports at its bottom part adapted to move into and out of position beneath the bottom, the supports, when moved inwardly being so housed beneath the bottom that nesting of two or more baskets is not prevented.

This is a specially important object since the freight rates on such devices are dependent, not only on the weight but also on the space occupied.

A second object of the invention is to provide an improved arrangement of handle securing means for such a basket.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a basket constructed in accordance with this invention.

Figure 2 is a bottom plan thereof.

Figure 3 is an enlarged detail section on the line 3—3 of Figure 2.

Figure 4 is an enlarged detail section on the line 4—4 of Figure 1.

Figure 5 is a section on the line 5—5 of Figure 2.

In the embodiment of the invention herein illustrated there has been shown a woven wire basket or body 10 of frusto-conical form and having its upper edge bound and reinforced by a band 11 provided at its upper edge with an out turned flange 12. This flange is interrupted at the point from which the handle extends as shown at 13.

Around the band 11 beneath the flange 12 extends a wire 14 and at the gap 13 the wire extends upwardly through said gap in parallel portions 15. Around these parallel portions extends a split sleeve or band 16 which is crimped, as shown in Figure 4, to closely engage the portions 15 and hold them tightly together so that the wire 14 can neither slip off the basket nor turn around it. At the upper ends of the portions 15 the wire is bent away from the basket to provide parallel portions 17 which are bound together by a ring or sleeve 18. Beyond the ring 18 the handle grip 19 is formed having parallel sides, converging front portions meeting the portions 17 and a curved extremity.

Below the bottom of the basket or body is a reinforcing plate 20 which is provided with loops 21 forming bearings. Extending through these bearings connected below the bottom is the middle part of the front supports which consist of a single length of wire bent to form arms 22 offset at their center to form a spring and provided with hook ends 23 as in Figure 1.

The remaining support consists of a wire 26 slidable through the ring 18 and having one extremity bent around one side of the handle grip 19 as at 27. The other part of this wire extends downward as at 28 parallel to the basket side and then inwardly as at 29 through a loop 29' beneath the basket bottom, this inwardly extending portion being provided with downward bends 30 to prevent slipping off a vessel rim.

Since the bearings 21 are eccentric of the basket bottom the forward hooks can be swung to lie beneath the bottom. The rear support can then be pushed forwardly and one basket can be nested within another.

There has thus been provided a simple and efficient device of the kind described and for the purpose specified.

It is obvious that minor changes may be made in the form and construction of the invention without departing from the material spirit thereof. It is not, therefore, desired to confine the invention to the exact form therein shown and described, but it is desired to include all such as properly come within the scope claimed.

Having thus described the invention, what is claimed as new, is:

A utensil of the kind described having a plurality of supporting arms pivoted beneath the bottom of utensil eccentrically thereof and arranged to protrude beyond said bottom when swung into one position and to be housed beneath said bottom when swung into a second position, a further supporting arm located beneath the bottom and movable inwardly and outwardly thereof independently of the first arms, and a handle extending from the utensil and supporting the last mentioned arm movably into and out of protruded position.

In testimony whereof I affix my signature.

WALTER BRUCE WILLS.